US007571111B2

(12) United States Patent  (10) Patent No.: US 7,571,111 B2
Ahrens et al.  (45) Date of Patent: Aug. 4, 2009

(54) COMPUTER SYSTEM FOR MONITORING ACTUAL PERFORMANCE TO STANDARDS IN REAL TIME

(75) Inventors: Bruce Ahrens, Stewartstown, PA (US); David Cartier, Roswell, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 500 days.

(21) Appl. No.: 10/812,484

(22) Filed: Mar. 29, 2004

(65) Prior Publication Data

US 2005/0216331 A1  Sep. 29, 2005

(51) Int. Cl.
  *G06F 17/60* (2006.01)
(52) U.S. Cl. ............................. 705/11; 705/7; 715/772
(58) Field of Classification Search ........................ None
  See application file for complete search history.

(56) References Cited

U.S. PATENT DOCUMENTS

| | | | |
|---|---|---|---|
| 4,408,100 A | 10/1983 | Pritz et al. | |
| 4,510,351 A | 4/1985 | Costello et al. | |
| 4,819,162 A | 4/1989 | Webb, Jr. et al. | |
| 5,068,787 A | 11/1991 | Pipella et al. | |
| 5,212,635 A | 5/1993 | Ferriter | |
| 5,299,260 A | 3/1994 | Shaio | |
| 5,535,256 A | 7/1996 | Maloney et al. | |
| 5,826,240 A * | 10/1998 | Brockman et al. | 705/11 |
| 5,864,784 A | 1/1999 | Brayton et al. | |
| 5,867,823 A * | 2/1999 | Richardson | 705/9 |
| 6,073,062 A * | 6/2000 | Hoshino et al. | 701/3 |
| 6,157,808 A | 12/2000 | Hollingsworth | |
| 6,400,997 B1 * | 6/2002 | Rapp, III | 700/83 |
| 6,430,488 B1 | 8/2002 | Goldman et al. | |
| 6,466,663 B1 | 10/2002 | Ravenscroft et al. | |
| 6,496,775 B2 | 12/2002 | McDonald, Jr. et al. | |
| 6,871,195 B2 * | 3/2005 | Ryan et al. | 706/46 |
| 6,954,737 B2 * | 10/2005 | Kalantar et al. | 705/50 |
| 2002/0077849 A1 | 6/2002 | Baruch et al. | |
| 2002/0087345 A1 | 7/2002 | Bly et al. | |

(Continued)

FOREIGN PATENT DOCUMENTS

EP  0745959  12/1996

(Continued)

OTHER PUBLICATIONS

United Parcel Service of America, Inc., "Delivery Acquisition Device Reference Guide (Redacted Version)," Jul. 2, 2001.

(Continued)

*Primary Examiner*—Albert DeCady
*Assistant Examiner*—Dave Robertson
(74) *Attorney, Agent, or Firm*—Alston & Bird LLP

(57) ABSTRACT

The present invention provides a system and method for conducting a management session between a supervisor and an employee or other subordinate. The system utilizes a handheld personal computer that is programmed with multiple supervisory functions, which are displayed in an integrated format to reduce the number of supervisory sessions required for a given employee. The system also provides for the capture and storage of automatic work measurement data, which can be integrated with other work measurement data captured by one or more sensing devices within the employee's workspace, and performance to standards can be reviewed in real time via real-time alerts or at the end of the evaluation.

10 Claims, 9 Drawing Sheets

U.S. PATENT DOCUMENTS

| | | |
|---|---|---|
| 2002/0165694 A1 | 11/2002 | Chene et al. |
| 2002/0198748 A1 | 12/2002 | Eden et al. |
| 2003/0013438 A1 | 1/2003 | Darby |
| 2003/0114206 A1 | 6/2003 | Timothy et al. |
| 2003/0115094 A1 | 6/2003 | Ammerman et al. |
| 2003/0140021 A1* | 7/2003 | Ryan et al. .................... 706/16 |
| 2004/0039527 A1 | 2/2004 | McDonald, Jr. et al. |
| 2005/0053904 A1* | 3/2005 | Shephard et al. ............ 434/236 |

OTHER PUBLICATIONS

International Search Report from corresponding International Application No. PCT/US05/09633 dated Mar. 23, 2005.

International Search Report from corresponding International Application No. PCT/US05/09633 dated May 2, 2007.

Supplemental Search Report dated Nov. 28, 2008, European Patent Application No. 05729256.7, filed Mar. 23, 2005.

* cited by examiner

(INSIDE AM)

Car No. ▼ | Mileage 0 | Car Size ▼

☐ Be Prompt | ☐ DIAD Information
☐ Appearance | ☐ Get Supplies
☐ Proper Footwear | ☐ Get EDD
☐ Set Routine | ☐ Routine at Car
| ☐ Exit Routine
| PreTrip Audit
Notes | Inside AM Methods

FIG. 4E

(OJS RIDE MENU)

Record Inside AM Activities
Record On Road Activities
Record Inside PM Activities Planned SPORH
12.0

Default contact mode:
● Manual
○ Delivery
○ Pickup

Notes

FIG. 4D

FIG. 4K (DELIVERY CONTACT)

FIG. 4J (WALK)

FIG. 4I (SELECT)

COMPUTER SYSTEM FOR MONITORING ACTUAL PERFORMANCE TO STANDARDS IN REAL TIME

FIELD OF THE INVENTION

The present invention relates generally to the coordination of management activities, and more particularly, to a handheld computer system for facilitating evaluation and training of a plurality of employees.

BACKGROUND OF THE INVENTION

The success of a business often hinges on its ability to create and maintain a highly efficient workforce. To meet this need, a company must invest the time and effort needed to properly train its employees, and evaluate their performance. On-the-Job training and Supervision (OJS) is one of the primary means by which many companies seek to achieve this objective. OJS can include any type of training or evaluation activities that seek to improve the effectiveness of a company's workforce. Although, in practice, "training" activities and "evaluation" activities may overlap, training refers generally to instructing an employee on the proper way of doing something, and "evaluation" refers generally to the process of observing and recording the manner in which an employee performs his or her job.

A management session between a supervisor and a subordinate typically comprises evaluating and/or training the subordinate in a particular job-related area, such as production, safety, service or sales. Traditionally, a supervisor conducts a management session using a clipboard with one or more printed sheets of paper, and a timing device if timing data needs to be collected. The printed sheets of paper are typically forms that provide the supervisor with guidelines and background information pertaining to the current management session. The sheets also provide the supervisor with a medium on which to record information regarding events that occur during the session. After a management session, the printed sheets of paper can be filed away for later reference and analysis.

One problem with the traditional method is that it makes analyzing and sharing information across an organization cumbersome. Another problem with this method is that it generates a large amount of paper work that needs to be organized, and processed. This is especially problematic in the case of large corporations, which can have thousands of employees. To address these types of problems, some prior systems now use computer data collection. For example, International Patent Application No. PCT/US96/02481 to Kadaba discloses a system that uses a hand-held, portable computer for coordinating maintenance, or other activities, for a plurality of motor vehicles, which includes the capability to track the amount of time it takes an employee to complete each of the tasks he or she performs in a day. However, these types of systems have still not addressed a number of other problems related to the training and evaluation of employees, some of which are described below.

Another problem with existing methods is that they are time consuming. Typically, to ensure that management sessions are effective a supervisor must conduct separate sessions for different types of training or evaluation. Therefore, a session is usually designed to focus on a particular job-related area of training and evaluation, such as production, safety, service or sales. Since this results in more management sessions per employee, the above approach is both costly and inefficient. The problem can be further compounded by the fact that some organizations, such as package delivery companies, are required to perform many of these individual evaluation and training sessions out in the field with employees who are moving from place to place.

Yet another problem with existing methods is that they do not provide a way of compensating for the training and evaluation discrepancies that can occur as a result of different supervisors possessing different levels of knowledge and experience. The more numerous and sophisticated training and evaluation methods become within an organization, the more likely it is that some supervisors will be less knowledgeable and/or less experienced than other supervisors. Such discrepancies across different supervisors can lead to inconsistent training and evaluation of employees.

Therefore, a need exists in the art for a system for, and method of, efficiently and effectively training and evaluating employees. The method and system should minimize paper, facilitate the ability to analyze and share information across an organization, provide an efficient way to train and evaluate employees in a number of different job-related areas including those who move from location to location during the work day, and mitigate discrepancies that occur as a result of supervisors possessing different levels of knowledge and experience.

BRIEF SUMMARY OF THE INVENTION

The present invention seeks to provide a system and method for efficiently and effectively training and evaluating employees, which minimizes paper, facilitates the ability to analyze and share information across an organization, provides an efficient way to train and evaluate employees in a number of different job-related areas including those who move from location to location during the work day, and which mitigates discrepancies that occur as a result of supervisors possessing different levels of knowledge and experience.

In accordance with the present invention, this object is accomplished in a handheld personal computer that is programmed with multiple supervisory functions, which are displayed in an integrated format to reduce the number of supervisory sessions required for a given employee. The system also provides for the capture and storage of automatic work measurement data, as well as health and safety data, which can be integrated with yet other data captured by one or more sensing devices within the employee's workspace.

One embodiment of the present invention is a computer for facilitating management activities relating to a subordinate's work, which comprises a memory for storing data relating to a plurality of management activities, a display, an interface for inputting information, and a processor, configured to initiate a management session relating to the subordinate. Furthermore, within a management session, the processor is configured to display a first set of stored data relating to a first management activity, receive and store a first set of input data relating to the first management activity, display a second set of stored data relating to a second management activity, and receive and store a second set of input data relating to the second management activity.

Preferably, the first and second stored data can be displayed concurrently. In particular, according to one embodiment, the first stored data comprises a preferred method associated with a first training activity, the second stored data comprises a preferred method associated with a second training activity, and the processor is configured to display the second stored data in a visually distinctive manner from the first stored data.

According to another embodiment, the processor is configured to monitor a frequency of occurrence of an input signal that the processor uniquely associates with the selection of a preferred method, and wherein the processor is further configured to modify the display of a visual representation related to the preferred method in response to the frequency of occurrence of the input signal exceeding a predetermined threshold.

Another embodiment of the present invention provides a computer for facilitating a mentor's activities relating to a trainee's work that comprises memory, a display, an interface for inputting information, and a processor configured to initiate a session relating to a trainee. Within the session, the processor is configured to receive and store input data related to a characteristic of the trainee's work, monitor a frequency of occurrence of the characteristic, display information related to the input data, and, responsive to the frequency of occurrence of the characteristic exceeding a predetermined threshold, modify the display of the information. Preferably, the step of modifying the display of the information comprises changing at least a part of the display of the information to a different color.

Another embodiment of the present invention is a method of facilitating management activities relating to a subordinate's work by using a computer, comprising displaying a first set of stored data relating to a first management activity, receiving a first set of input data relating to the first management activity, and storing the first input data. The method further comprises displaying a second set of stored data relating to a second management activity, receiving a second set of input data relating to the second management activity, and storing the second input data. Preferably, the first and second stored data can be displayed concurrently.

Yet another embodiment of the present invention is a method of facilitating a mentor's activities relating to a trainee's work by using a computer, comprising receiving input data related to a characteristic of the trainee's, storing the input data in a memory in the computer, and monitoring a frequency of occurrence of the characteristic. The method further comprises displaying information related to the input data, and responsive to the frequency of occurrence of the characteristic exceeding a predetermined threshold, modifying the display of the information.

Yet another embodiment of the present invention provides a hand held device for facilitating user evaluation or training of a service worker who moves from place to place during the performance of services, comprising a user interface for receiving information, a data transfer device for receiving and transmitting information, an information storage device, a screen device for displaying information, and a processor coupled to the user interface, the data transfer device, the information storage device, and the screen device. In such embodiment, the processor is configured to store on the hand held device stored data associated with a plurality of job elements and job methods to be performed by the service worker over the course of a work session, and display on the hand held device a first screen associated with a first job element, the first screen displaying a plurality of job methods associated with the first job element, each job method having a selection area displayed in association therewith. The processor is further configured to receive via the user interface of the hand held device, user input relating to the manner in which the service worker performs the job methods of the first job element, said user input comprising the selection of a job method on the first screen, and responsive to selection of the selected job method, store an indication of a level of performance by the worker of the selected method.

Yet another embodiment of the present invention is a method of facilitating user evaluation or training of a service worker who moves from place to place during the performance of services, comprising storing on a hand held computer data associated with a plurality of job elements and job methods to be performed by the service worker over the course of a work session, displaying on the hand held computer a first screen associated with a first job element, the first screen displaying a plurality of job methods associated with the first job element, receiving at a first location via a user interface of the hand held computer, first user input relating to the manner in which the service worker performs the job methods of the first job element, and storing the first user input as part of a record of worker activity. The method further comprises traveling with the service provider to a second location, displaying on the hand held computer a second screen associated with a second job element, the second screen displaying a plurality of job methods associated with the second job element, receiving at the second location via the user interface of the hand held computer, second user input relating to the manner in which the service worker performs the job methods of the second job element, and storing the second user input as part of the record of worker activity.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a block diagram of a system for coordinating management activities associated with a plurality of employees in accordance with an embodiment of the present invention.

FIG. 2. is a diagrammatic view showing the information transmitted between the components of the system of FIG. 1 in accordance with an embodiment of the present invention.

DETAILED DESCRIPTION OF THE INVENTION

The present invention now will be described more fully with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
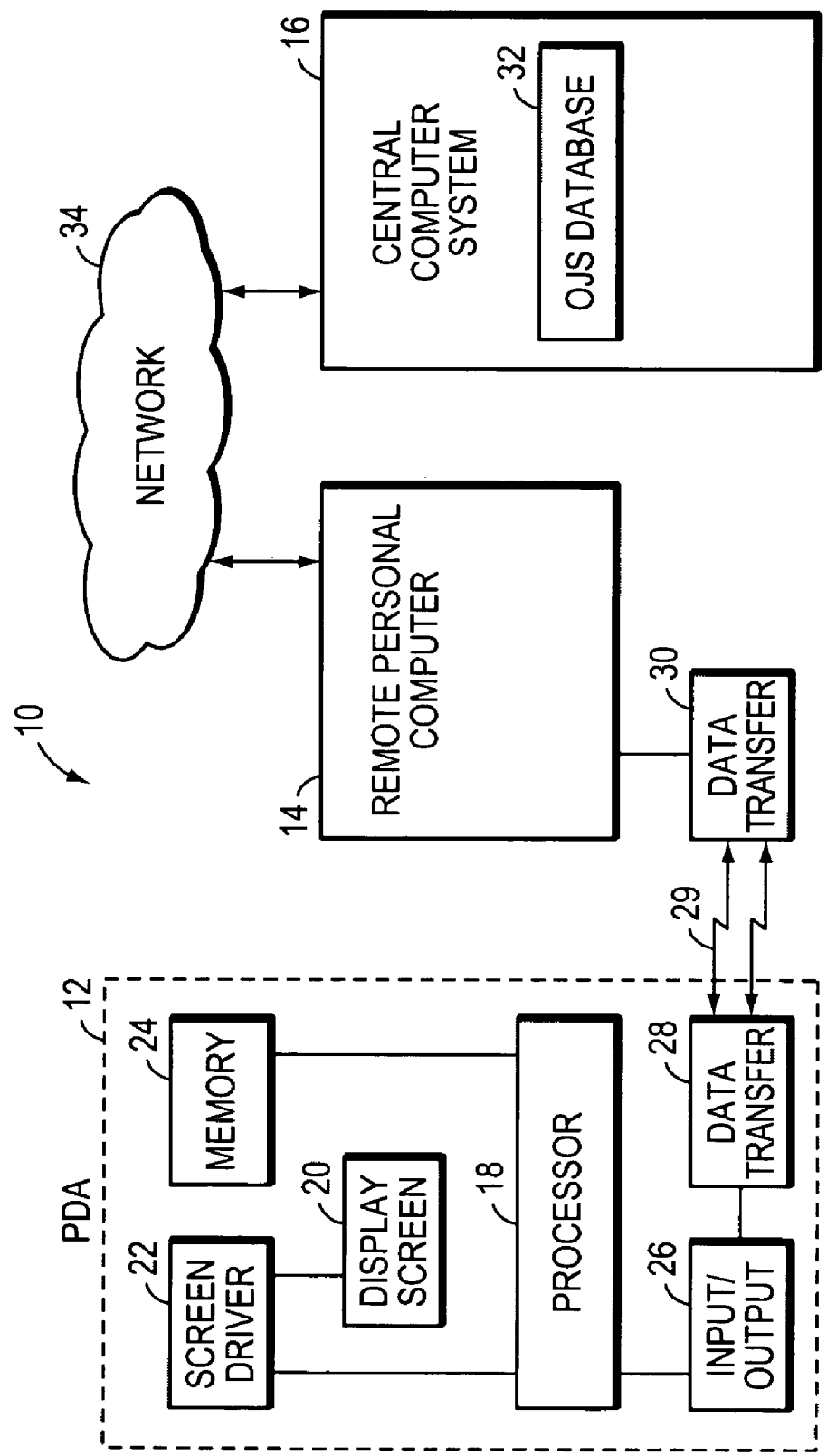

FIG. 1 shows the components of a system 10 for coordinating management activities associated with a plurality of employees in accordance with an embodiment of the present invention. In a preferred embodiment, the system 10 coordinates management evaluation and training activities for a plurality of package delivery drivers. The system 10 can be particularly advantageous in assisting supervisors who are required to accompany package delivery drivers out in the field to evaluate their performance and administer on-route training. While the preferred embodiment described in detail below focuses on evaluation and training of package delivery drivers, it will be readily understood by those skilled in the art that the system 10 can be used to coordinate management activities for employees at many different types of organizations.

The system 10 includes an intelligent, hand-held, portable computing device 12, of the type known as a personal digital assistant (PDA), a remote personal computer 14, and a central computer system 16, connected for data communication to each other in a well-known manner as described below. The PDA 12 includes a processor 18 that is typically implemented as a microprocessor. The processor 18 is operative to control various devices within the PDA to receive, store, retrieve, process, and display data. A preferred PDA 12 for use in connection with the present invention is the iPAQ Pocket PC manufactured by Hewlett Packard.

The PDA 12 includes an input device that is associated with a display device to form a touch-sensitive data entry and display screen 20. The display screen 20 is connected to the processor 18 via a screen driver circuit 22, which operates the input and display functions of the display screen. In a preferred embodiment, a stylus (not shown) is used in cooperation with the display screen 20 for data entry. This is done by engaging a tip of the stylus against the display screen 20 and touching controls defined by the screen or writing on the screen. The processor 18 via the screen driver circuit 22 is programmed to be capable of interpreting handwriting and of defining button or key areas on the display screen 20. For example, the screen 20 may display a typewriter keyboard, a numeric keypad, a box for entering handwritten text, or controls that cause certain operations to occur, all operable by touching the screen, preferably with a stylus.

The processor 18 is also connected to a memory device 24, which may be RAM (protected by battery back up), a removable memory card, or other memory capable for use with a PDA 12. In accordance with the present invention, the memory device 24 on the PDA 12 stores data related to one or more management activities associated with a management session. The memory 24 is also used to store any input data relating to the one or more management activities associated with the management session.

An input/output (I/O) device 26 is connected to the processor 18 and controls communications between the PDA 12 and other devices through a data transfer device 28. Preferably, the data transfer device 28 includes an infra-red port. An infra-red port is a known wireless device for optical data communication between similarly equipped devices that are remote to one another and will not be further described herein. As alternatives or in addition to the infra-red port, data communication between the PDA 12 and other devices may be over known means, such as cable, RF link, or other optical link. For example, instead of or in addition to the infra-red port, the data transfer device 28 of the PDA 12 may include one or more of the following radios: a Wireless Wide Area Network (WWAN) data radio, a Wireless Local Area Network (WLAN) data radio, and a Wireless Personal Area Network (WPAN) data radio (e.g., Bluetooth, WiFi, etc.), for communicating with remote personal computers 14, the central computer system 16, or other systems.

Although the touch-sensitive data entry and display screen 20 is the preferred means of data entry, those skilled in the art will understand that data may be entered by other means, including audibly. For example, textual instructions and statements presented to the user on the display screen 20 may be audibly announced using voice wave files and a voice chip often built into the PDA 12. Other input devices, such as keyboards and data scanners may be connected via the I/O device 26. For example, in one embodiment the PDA 12 may be equipped with a bar code scanner. In another embodiment, the PDA 12 can include a point-and-shoot laser scanner or CCD reader, or other well-known reader. The PDA 12 can also be equipped with an electromagnetic scanner capable of reading, for example, radio-frequency identification (RFID) tags. In yet another embodiment, the PDA 12 can be equipped to receive input from other devices or sensors by means of FM transmission technology, which is commonly used in short- and ultra-short-range (i.e., a few feet) broadcast applications.

As shown in FIG. 1, the system 10 includes a remote personal computer 14 and a central computer system 16. Remote personal computers 14 can be available for use at a plurality of remotes sites. The remote sites correspond to locations where one or more supervisors use the PDAs 12 to facilitate evaluation and training sessions with subordinates. The remote personal computer 14 is equipped with a data transfer device 30 compatible with one or more of the data transfer devices 28 of the PDA 12. With appropriate programming of the PDA 12 and the remote personal computer 14, information can be downloaded from the remote personal computer into the memory 24 of the PDA via the wireless link 29. Additionally, information acquired by the PDA 12 can be uploaded into the remote personal computer 14. Preferably, the wireless link 29 is established, for example, by an infra-red port, another optical port or a radio of one of the types described above. As alternatives to the wireless link 29, data communication between the PDA 12 and the remote personal computer 14 may be over other known means, such as a cable.

Application software on the remote personal computer 14 provides a desktop interface to setup the PDA 12. This enables each remote site to customize the PDA 12 by importing and installing data, some of which can be unique to management sessions conducted at each of the remote sites. For example, in the case of a package delivery business like UPS®, Inc., customized information for a particular management session may include driver information, package car information, site information and area information, which can be downloaded from the remote personal computer 14 to the PDA 12. Using the application software, the remote personal computer 14 also provides the functionality to view and print reports related to training and evaluation data that is uploaded from the PDA 12 after each management session.

The central computer system 16 can be used to coordinate management activities across an entire organization, and includes an On-the-Job training and Supervision (OJS) database 32. The OJS database 32 stores evaluation and training histories that can allow for analysis of employee performance, supervisor performance, and company-wide performance. The central computer system 16 is preferably connected to the remote personal computers 14 via a network 34. The network 34 can be the Internet or other public or private communications network, for example. However, the central computer system 16 can also be connected to communicate with the remote personal computer 14, and in some cases the PDA 12, via other communication ports, wired or wireless, as described above.

Figure 2:
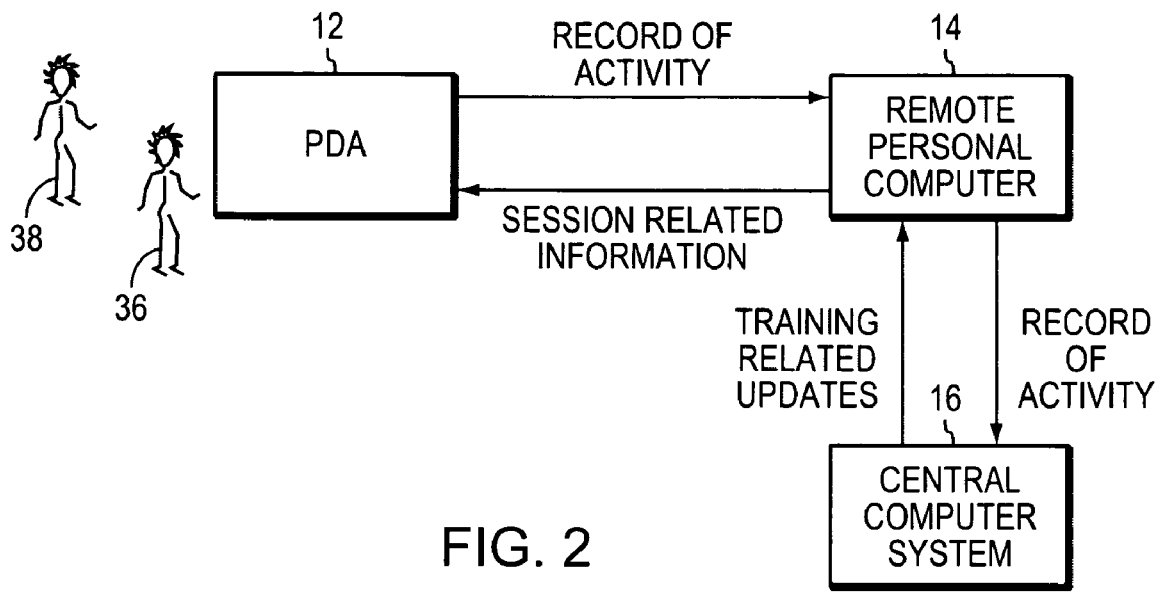

FIG. 2 shows an overview of the information transmitted between the components of the system 10 for coordinating the management activities associated with a plurality of employees according to an embodiment of the present invention. Updates generated at the central computer system 16 can be downloaded with appropriate frequency to remote personal computers 14 located at the remote offices of supervisors and their subordinate employees. The training updates may include new practices to be followed by employees, updated methods on how to perform existing practices, updated formats for recording performance data, and other related information. The updates from the central computer system 16 help to provide a more consistent format for managing employees across different locations, and across different supervisors. The updates also help to provide a more consistent format for recording evaluation and training data during a management session, which allows the recorded information to be readily added to the OJS database 32.

Another significant advantage of using the PDA 12 is that, at any point during a session, data contained on the PDA can be made immediately available to other entities within an organization. This can be accomplished in a known manner by transmitting such data via one or more transmission channels using, for example, at least one of the PDA's data radios described above. In other words, if a PDA 12 is being used out in the field, and an event is recorded by the PDA that may be of immediate significance to an entity in an entirely different location from where the PDA is being used, then such data (and any other data) can be immediately transmitted either directly or via a network server, from the PDA 12 to that entity by using one or more of the communications means described above. Similarly, data can also be received by the PDA 12 from one or more such locations either directly or via a network server. Thus, the PDA 12 provides the additional benefit of allowing other remotely located entities to interact with the events of a management session in real time, when necessary.

It should be understood that the term "management," as used herein, is to be construed broadly. In other words, the present invention is applicable to a wide variety of situations in which a first person is engaged in some form of evaluation and/or training of a second person. Therefore, those of ordinary skill in the art will readily appreciate that any number of terms could be used to describe such a situation. For example, in referring to the respective parties involved in an evaluation and/or training session, any of the following terms might be applicable depending on the circumstances: "observer" and "subject," "supervisor" and "subordinate," "supervisor" and "employee," "mentor" and "mentee," "trainer" and "trainee,""teacher" and "student" and other such terms. However, for the sake of convenience in describing the preferred embodiments of the present invention, the terms that will be used most frequently to describe the respective parties are "supervisor" and "subordinate," or "supervisor" and "employee." Thus, the use of these particular terms, or other such terms, and the term "management" should in no way be construed as limiting the scope or applicability of the present invention.

In addition to providing a more structured approach to training and evaluation, the system 10 is also advantageous for when an organization needs to rapidly deploy one or more new training or evaluation practices. To expedite the implementation of the one or more new practices, corresponding information can be entered into the central computer system 16, transmitted from the central computer system to remote personal computers 14 via the network 34, and downloaded from the remote personal computers to a supervisor's PDA 12 via the wireless communication link 29. With the information downloaded into the supervisor's PDA 12, the supervisor can begin using the PDA to evaluate and/or train a delivery driver on the new practices almost immediately. The manner in which the PDA 12 is used to coordinate these activities is described in detail below.

More generally, the PDA 12 can be used to facilitate a management session between a supervisor 36 and a subordinate 38. The PDA 12 is particularly advantageous in assisting a supervisor 36 who is required to accompany an individual 38 out in the field to evaluate their performance and administer training. For example, an on-road supervisor 36 at a package delivery company can use the PDA 12 to facilitate an on-route evaluation and training session with a delivery driver 38. When PDAs that are similarly programmed are used by supervisors to evaluate and train employees throughout an organization, the evaluation and training will be more consistent and more efficient. After session-related information is downloaded from the remote personal computer 14 to the PDA 12, the supervisor 36 can begin the management session by logging onto his or her PDA. The PDA 12 is programmed to provide the supervisor 36 with a series of screens displays that are designed to assist the supervisor in evaluation or training of the subordinate 38. The screen displays are also designed to provide a standardized format for capturing a record of activity comprising the relevant events which occur during the management session.

The PDA 12 is programmed to display a number of screens that correspond to a list of elements which comprise the building blocks of an employee's workday. In other words, the element screens correspond to a logical breakdown of the activities that occur during the employee's workday. Some elements may correspond to a task or activity that the subordinate 38 performs only once daily, such as a pre-trip routine performed by a package delivery driver, and other elements may correspond to a particular activity which the subordinate performs repeatedly, such as traveling to/from each package delivery location along a delivery route. The screen display associated with each element typically identifies one or more practices or prescribed work methods to which the subordinate 38 should adhere while engaged in that element of his or her workday.

The individual practices displayed in association with each element can generally be classified as belonging to a particular job-related area, such as production, safety, sales and service. In other words, each element of the employee's workday can have associated with it a number of practices, some of which may be either production practices, safety practices, service practices or sales practices, for example. In a preferred embodiment, the PDA screen associated with a given element includes element-related practices classified as belonging to two or more job-related areas displayed concurrently. For example, the screen display associated with work element "A" may include a list of production practices associated with element "A", and concurrently a list of safety practices associated with element "A". In another embodiment, the screen associated with a given element can include practices belonging only to a single job-related area, such as an element screen that displays only safety practices. Examples of these aspects of a management session are provided below.

The PDA screen displays are designed to help a supervisor focus on the one or more practices associated with each element that an employee becomes engaged in over the course of a management session. If the employee fails to comply with one of the practices associated with a given element, input data can be received and stored by the PDA 12 to mark the occurrence of the event. In a training phase of the management session, the supervisor can explain the mistake and review the correct method with the employee. When applicable, the PDA 12 allows the supervisor 36 to access a text version of the correct method being reviewed. Examples of these aspects of a management session are provided below.

Note that the phrase "input data," as used herein, is to be construed broadly in the sense that the input data can originate from a variety of sources. For example, the input data may be the result of a user operating the stylus in association with the display screen 20. This typically occurs, for example, when a supervisor 38 uses the stylus to check a box or write a note in an area defined on the display screen 20. However, the input data may also originate from an internal device, such as a clock within the PDA 12 that is being used to keep track of the time it takes an employee to complete a particular element.

Furthermore, input data can also be transmitted from an external sensor within the employee's workspace. The external sensor can be of a type that is operable to detect an event pertaining to the management session, and to then communicate the occurrence of such event to the PDA 12. For example, the PDA 12 could be configured to communicate with a telematics system that has been incorporated into a package delivery vehicle. The telematics system may be operable to provide a wide variety of input data to the PDA 12, such as door sensor data, global positioning (GPS) data, engine sensor data, weather data, ignition data, mileage data, and other such data that may be helpful to the process of performing and/or analyzing a management session. Such data can be used in a virtually limitless number of ways. For example, GPS data could be used to reset a real-time clock within the PDA 12. Or, vehicle velocity data could be transmitted to the PDA 12 to alert a supervisor as to whether the driver is maintaining a posted speed limit. Yet another example may include transmitting door sensor data from a telematics device to the PDA 12 so that the PDA can record whether or not the driver accessed packages for delivery via the proper delivery vehicle door.

As mentioned above, the PDA 12 also typically receives input data prior to each use. For example, in the case of a management session conducted with a package delivery driver, such input data may include a list of all planned stops along the driver's delivery route, the address of each stop, a list of known packages to be delivered and/or picked up at each stop, and other relevant data associated with the plan for that day's ride. By having such data stored on the PDA 12 prior to a given management session, the PDA can be programmed to automatically populate corresponding data fields as the supervisor navigates through each of the display screens over the course of a management session. For example, using the input data downloaded to the PDA 12 prior to the day's ride, the PDA can be programmed to automatically populate the address field(s) associated with each stop number, as well as other displayed data fields such as the number of packages to be dropped off or picked up at each stop. This is an important feature because it allows the supervisor to spend more time performing evaluation and training of the employee, rather than wasting such valuable time entering the data manually. Of course, the PDA 12 is still equipped to allow the supervisor to enter such data manually, should there be a need.

At the end of a management session, the record of activity stored in the memory 24 is uploaded from the supervisor's PDA 12 to the remote personal computer 14 of his or her base office. The record of activity can then be transmitted from the remote personal computer 14 to the central computer system 16, in which the OJS database 32 is updated.

Figure 3:
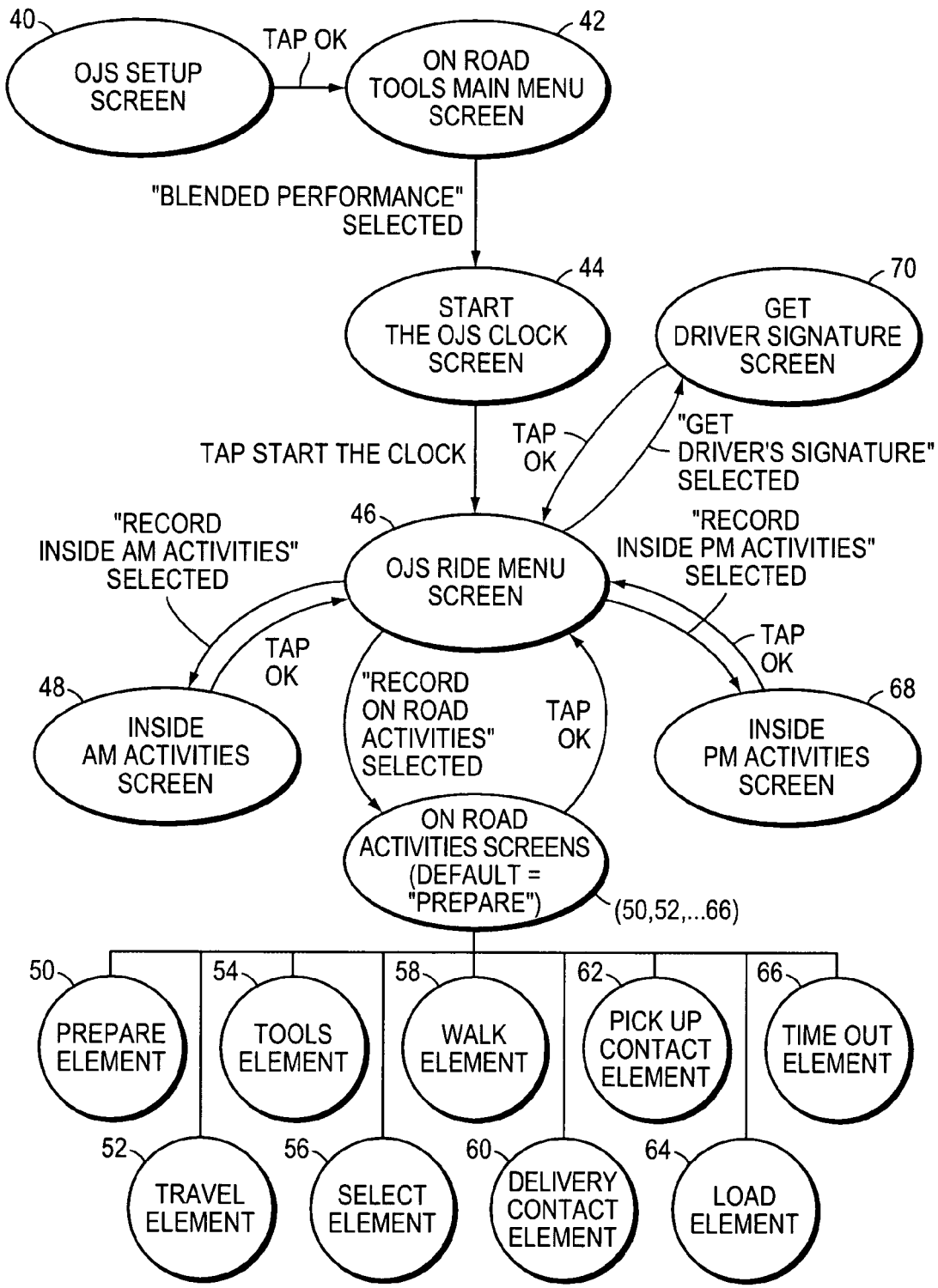
FIG. 3 is a state diagram that illustrates the sequence of steps for performing an on-road evaluation and training session using the PDA in accordance with an embodiment of the present invention.

FIG. 3 is a state diagram showing the process for performing an on-road evaluation and training session (OJS ride) using the PDA 12 in accordance with an embodiment of the present invention. An "OJS ride," as referred to herein, generally comprises three distinct phases of a package delivery driver's workday, including "Inside AM Activities," "On Road Activities," and "Inside PM Activities." Operation of the PDA 12 in relation to each of these phases will be described in detail below. Screen displays of the user process are shown by FIGS. 4A-4O.

After the PDA 12 is activated, the process displays an "OJS Setup" screen at state 40 from which a supervisor, or other user, can enter or select setup information to configure the PDA for an OJS ride. The OJS Setup screen is best shown by the screen display of FIG. 4A. Selections are made from the OJS Setup screen, and from other screens, by touching the portion of the display screen 20 that defines a control of the desired function. In the preferred embodiment, a stylus is used to touch the display screen 20 when making a selection.

Figures 4A, 4B, 4C:
FIGS. 4A-4P are a sequence of screen displays from the user's perspective showing the process of performing an evaluation and training session with the PDA in accordance with an embodiment of the present invention.

As shown by FIG. 4A, the supervisor is prompted to enter various setup information. In one embodiment, the setup information includes, but is not limited to: the driver's name; the observer's name (i.e., the on-road supervisor); a package delivery center number; the driver's delivery area (or route number); the delivery driver's license expiration date; a supervisor group; the driver's Department Of Transportation Physical date; the delivery driver's employee number; today's date (i.e., on the day of the OJS ride); the primary reason for the OJS ride; and the car number, car size and starting mileage of the package delivery vehicle that will be used during the OJS Ride.

Some of the data fields in the OJS Setup screen, and other screens, may include drop-down menus containing information that was downloaded to the PDA 12 prior to (or during) the OJS ride. Thus, the user may be able to choose, for example, the driver's name, the observer's name and the center number from drop-down menus. However, if the information for a given data field is not provided in a drop-down menu, it can be key entered manually by using the stylus to enter the information via an alphabet keyboard displayed a the bottom of the display screen 20. The keyboard may be displayed automatically by the processor 18 in response to the user tapping in a particular data field, or the user can cause the keyboard be displayed by tapping on the keyboard icon located in the lower right-hand corner of the OJS Setup screen. To make the keyboard disappear, the user clicks on the keyboard icon again.

After all required setup information has been entered, the supervisor proceeds to state 42 by using the stylus to tap or click the "ok" button located in the upper right-hand corner of the OJS Setup screen. At state 42, the process displays the "On Road Tools Main Menu" screen from which the user can select "Blended Performance," "Accident Follow-up," "Injury Follow-up," "Drop Box Audit," or "View Methods." The On Road Tools Main Menu screen is best shown by the screen display of FIG. 4B.

To continue with the process of performing an OJS ride using the PDA 12 as shown in FIG. 3, the user proceeds to state 44 by selecting the "Blended Performance" function from the Main Menu screen. At state 44, the process displays a "Start the Clock" screen from which the supervisor can choose to begin the OJS ride when ready. Preferably, the supervisor should not start the OJS clock prior to the delivery driver's designated start time. The Start the Clock screen is best shown by the screen display of FIG. 4C. The supervisor initiates the OJS ride by tapping on the "Start The OJS Clock" button at the top of the screen. This triggers an internal timer that is used for timing all events that occur during the OJS ride. The "Start the Clock" screen also includes a "Notes" button for electronically recording any notes the user may have at this point in the OJS ride, and a field for the user to enter a planned "SPORH," which is an estimate of the Stops Per On-Road Hour that the package delivery driver should be able to achieve during the current OJS ride.

Additionally, the "Default Contact Mode for Ride" field shown in FIG. 4C determines whether the PDA 12 will display the delivery or pickup screen each time the user selects the "contact" element during the on-road portion of the OJS ride. The contact element corresponds to the point at which the driver either delivers a package to, or picks up a package from, a customer, and will be described in greater detail below. The default contact mode is "manual," which requires the observer to manually choose between the delivery and pickup contact screens during the contact portion of each stop along the delivery route. In another embodiment, the "contact" portion of the process can be automated. For example, using the ride-related data (mentioned above) that is downloaded to the PDA 12 prior to each OJS ride, the PDA can be programmed to determine for the user whether the current stop is a "delivery" stop, a "pickup" stop, or both. The process can further be automated by, for example, having a telematics device within the delivery vehicle that is capable of sending a signal via wireless transmission (e.g., Bluetooth) to the PDA 12 when it senses that the driver has cut off the engine of the delivery vehicle. In one embodiment, this trigger signal can be used by the PDA 12 to automatically start the clock for the "select" packages portion of a delivery stop. Numerous other such automation examples are possible as well.

When the supervisor initiates the OJS ride by tapping the "Start The OJS Clock" button, the process of performing an OJS ride as shown in FIG. 3 leads to state 46. At state 46, the process displays an "OJS Ride Menu" screen from which the supervisor can select "Record Inside AM Activities," "Record On Road Activities," and "Record Inside PM Activities." The OJS Ride Menu screen is best shown by the screen display of FIG. 4D.

If the Record Inside AM Activities function is selected from the OJS Ride Menu, the inside AM branch leads to state 48 wherein the "Inside AM Activities" screen is displayed. The phrase "Inside AM" refers to the portion of a package delivery driver's workday that occurs prior to the driver leaving the package center to perform his or her delivery route. The Inside AM screen is best shown by the screen display of FIG. 4E.

As shown by FIG. 4E, the supervisor can select or enter a Car Number and Car Size by using the stylus to click or tap on scroll-down keys and select from corresponding drop-down lists. To enter the mileage of the package delivery vehicle, the supervisor taps in the Mileage field, which causes a keyboard to appear in the bottom portion of the display screen 20. After entering the mileage, the user causes the keyboard to disappear by tapping on the small keyboard icon located in the lower right-hand corner of the window. For entering such data, other embodiments of the PDA 12 can have different types of keyboard or keypad entry devices. For example, one embodiment of the PDA 12 can include a physical keyboard that includes a set of individual keys physically formed on a face of the device. If the car number, car size, and current mileage of the delivery vehicle were entered in corresponding fields within the OJS Setup screen, then the processor 18 will automatically pre-fill these fields within the Inside AM Activities screen, and other screens. If the supervisor chooses to perform a pre trip audit, he or she would click or tap the "Pre Trip Audit" button and perform the audit using the corresponding screen displays (not shown) that appear. As with other types of input to the PDA 12, the processor 18 records the user-entered results of the pre-trip audit in the memory 24.

During the Inside AM portion of an OJS ride, the supervisor can select any method that the delivery driver fails to adhere to during the Inside AM routine. To allow the user to select a method, a selection area is displayed in association with each of the methods on the Inside AM screen, and other screens described below. In one embodiment, the selection area is a check box that can be checked using the stylus or a cursor. To select an Inside AM method that the delivery driver has failed to adhere to, the supervisor clicks in the box to the left of the corresponding method description. For example, one such method description shown in FIG. 4E is "Proper Footwear." If the supervisor determines that the delivery driver has not complied with the underlying guidelines associated with "Proper Footwear," then the supervisor can use the stylus to click or tap in the box next to "Proper Footwear." In response to this action by the supervisor, a check mark will appear in the box. To remove the check mark, the supervisor would click in the box again.

Any check marks that remain on the screen at the time the user exits the Inside AM Activities screen will be stored as input data by the processor 18 in the memory 24, and later interpreted as items on which the driver required corrective training. In a typical training situation, the supervisor should immediately explain the mistake and review the correct method with the delivery driver. If the supervisor would like to review what the correct Inside AM methods are, he or she can do so by clicking the "Inside AM Methods" button. Clicking the Inside AM Methods button allows the supervisor to access a list of text files that correspondingly describe each of the employer prescribed methods listed on the Inside AM screen.

Upon completion of the Inside AM portion of the OJS ride, the process returns to state 46 wherein the OJS Ride Menu is displayed once again. This is accomplished by tapping the "ok" button in the upper right-hand corner of the Inside AM screen. As mentioned previously, the OJS Ride Menu screen is best shown by the screen display of FIG. 4D.

Returning to FIG. 4D, if the "Record On Road Activities" function is selected from the OJS Ride Menu, the On Road branch of FIG. 3 leads to state 50 wherein the "Prepare" screen is displayed (by default) as the first of several "On Road Activities" screens that can be selected by the supervisor during the on-road portion of the OJS ride. The Prepare screen is best shown by the screen display of FIG. 4F.

Figures 4F, 4G, 4H:
Figure 4M:

As shown by FIG. 4F, the left-hand side of the Prepare screen comprises an elements menu of on-road elements screens that can be selected by the user during the on-road portion of the OJS ride. As will be seen, the elements menu as displayed on the left-hand side of the Prepare screen is common to most of the on-road screens that will be described. Having the elements menu present on each of the on-road elements screens is advantageous because it allows the user to rapidly switch from one on-road screen to another during the on-road portion of the OJS ride. This is important because unlike, for example, the Inside AM Activities screen, which is generally selected only once during an OJS ride, the supervisor is constantly cycling through each of the on-road elements screens as the driver correspondingly engages in some or all of such elements in the course of performing each stop along the delivery route.

Continuing with FIG. 4F, the right-hand portion of the Prepare screen displays stored data items relating to one or more management activities that are associated with the "prepare" element of a package delivery driver's workday. The prepare element refers to the period of time during which a driver prepares to go to the next stop along his or her package delivery route. Thus, like most of the on-road screens, the Prepare screen is a screen that the supervisor will typically return to a number of times during the on-road portion of the OJS ride. In the case of the Prepare screen, this will generally be each time the driver "prepares" to embark on another delivery stop.

For the purpose of capturing and evaluating time study data, the Prepare screen comprises a set of timing-related features including an "Allow" field, an "Actual" field, and an "Allowances Off" button. The "Allow" field displays the amount of time that the driver is given to complete a particular prepare element, and the "Actual" field displays the actual time it is taking the driver to complete the prepare element. The allowed time to complete the task can be a predetermined estimate of the task that is based on past time studies, and which is stored in the memory 24 and displayed by the processor 18. The processor 18 calculates the actual time by using an internal timer to monitor the amount of time that the user remains within the prepare screen during a given delivery stop. A supervisor can turn the allowance feature off, which stops the clock from counting, by clicking the "Allowances Off" button. To turn the allowance feature back on, the user simply clicks the button again.

As with other aspects of the present invention, the timing elements of the PDA 12 include one or more alert mechanisms that are designed to help a supervisor focus and prioritize his/her efforts during an evaluation and training session. For example, in one embodiment the PDA 12 is programmed to alert the supervisor that the driver is taking too long to perform the current task. One way of doing this is by causing the "actual" time field to change from a first color to a second color when the "actual" time surpasses the "allowed" time. In other embodiments, the alert mechanisms can be even more sophisticated with regard to the information they convey to the supervisor. For example, in a situation wherein the "actual" time surpasses the "allowed" time for a given task, the PDA 12 can be programmed to change the color (or other such feature) of the data field to one of a number of different color levels, with each color level (e.g., yellow, orange, red, etc.) indicating a degree of importance to which the supervisor should assign to that problem.

The varying color levels displayed by the processor 18 can be based on one or more factors. For example, one such factor may be the number of times that the employee exceeds the "allowed" time for a particular task, which he/she is required to perform repeatedly over the course of a management session. In other words, if a driver or other employee has only been over the "allowed" time for a particular task between one and five times, then the PDA 12 may only change the color of the "actual" time field from a default color (e.g., grey) to yellow, indicating to the supervisor that while the employee is exceeding the allowed time for the particular task, the problem has not yet risen to a level that warrants significant attention; at least not in the face of more immediate concerns that the supervisor may need to attend to. However, if the driver exceeds the "allowed" time for the same task, say between six and ten times, or perhaps even between eleven and fifteen times, over the course of the management session, then the PDA 12 can be programmed to display the "actual" field, respectively, in orange or even red, indicating to the supervisor that additional or more immediate action should be taken with regard to this particular problem.

By providing such visual cues or alerts, the PDA 12 allows the supervisor (at a glance) to rapidly prioritize the items on which to focus his/her efforts at any given point in time. This can be an extremely beneficial feature for either a newer supervisor who is still unsure of the best way to conduct a sometimes hectic management session, or any supervisor who is faced with having to simultaneously address numerous issues of potentially varying importance, in a limited amount of time.

In another embodiment, the different color levels (or other such alert mechanisms) displayed in association with the time fields can be based not just on whether or how many times the employee exceeded the "allowed" time for a given task, but also on the amount of time by which the employee exceeded the "allowed" time. The amount by which the employee exceeds an "allowed" time can be an important factor because the "allowed" times are typically based on an average time that it takes an average employee to perform a standard task. Therefore, depending on the particular circumstances surrounding any one execution of a given task, the fact that the employee exceeded the "allowed" time may not actually be indicative of the fact that the employee is having a problem with that task. For example, in the case of a package delivery driver, the standard "allowed" time to "select" a package from a delivery vehicle may be six seconds. However, if this standard "allowed" time is based on the average time it takes a typical driver to select a five pound package, then it may not be the most accurate measurement by which to judge a driver who needs to select one or more seventy pound packages.

Therefore, to account for this variation, and to prevent a supervisor from overreacting to a situation wherein there may not actually be a problem with the employee's performance, the alert mechanisms can additionally be based on the amount of time by which the employee exceeds the "allowed" time for a given task. For example, this can be done by using well known standard deviation techniques. In other words, by using collected data from past time studies, the mean time for each task (i.e., the "allowed" time) along with the standard deviation for each such task can be computed in a known manner. The PDA 12 can be programmed so that if the employee exceeds an "allowed" time by only a small amount (e.g., less than one-half of one standard deviation), then the processor 18 can display a first color (e.g., yellow), which is designated as an indication to the supervisor that the problem is of lesser importance. However, if the employee exceeds the allowed time by a significant amount (e.g., more than one whole standard deviation), then the PDA 12 can be programmed to display the particular time field using a second color (e.g., orange or red), which provide a stronger indication to the supervisor that the problem may in fact need more immediate or in depth attention.

Those of ordinary skill in the art will recognize that, depending on the application in which the PDA 12 is being used, any appropriate number of alert levels could readily be employed. It will additionally be understood that the PDA 12 could be programmed to generate such alerts based on any combination of the above-mentioned factors, or any other such factors. In general, the particular programming of the various alerts, and the information which they convey, can be a function of the application for which the device is being used. For example, in one embodiment, the background color of a given time field can be made to be a function of the amount of time by which the "actual" time exceeds the "allowed" time during each execution of that task, and additionally, a border area displayed around such time field can be made to be a function of the number of times, over the course of the management session, that the employee has exceeded the "allowed" time for that task, by at least some amount.

Continuing with FIG. 4F, as with the Inside AM Activities screen, the Prepare screen also comprises a number of employer prescribed work methods that are associated with the "prepare" element of the driver's workday. The supervisor can select any prescribed method that the delivery driver fails to adhere to during the prepare element. To select a prepare-related method that the delivery driver has failed to adhere to, the supervisor clicks in the box to the left of the corresponding method description. In response to this action by the supervisor, a check mark will appear in such box. To remove the check mark, the user clicks in the box again. Any check marks that remain at the time the user exits the prepare screen will be stored as input data by the processor 18 in the memory 24, and later interpreted as items on which the driver required corrective training. In a typical training situation, the supervisor should immediately explain the mistake and review the correct method with the delivery driver.

If the supervisor would like to review what any of the correct "Prepare" methods are, he or she can do so by first clicking on the "Tools" button found in the elements menu located on the left-hand side of the Prepare screen. The Tools screen is best shown by FIG. 4H, and will be described in greater detail below. From the "Tools" screen, the supervisor can access a list of text files, which correspondingly describe each of the employer-prescribed "Prepare" methods. This can be done by clicking on the "Element Methods" button. Similarly, to access a list of all methods (i.e., not just "Prepare" methods), the supervisor can click on the "View Methods" button displayed on the Tools screen. In another embodiment, the text file associated with each of the methods can be accessed directly by clicking on the text of the method descriptions, which are displayed on the element screens (i.e., the text of the method descriptions displayed on the element screens can act as hyperlinks to each of the corresponding text files).

In should be noted that the same functionality by which the PDA 12 allows "Prepare" methods to be displayed, selected, reviewed, etc. is provided by each of the evaluation and training screens described below, including other on-road activities screens such as "Travel," "Select," "Walk," "Contact," etc., and the "Inside PM Activities" screen.

Continuing with FIG. 4F, each of the method descriptions shown on the Prepare screen, and other screens of the PDA 12, can generally be classified as belonging to a particular job-related area, such as production, safety, sales, service, etc. To facilitate the supervisor's ability to perform training and evaluation in multiple job-related areas during a single management session, the PDA 12 is programmed to display method descriptions belonging to two or more job-related areas concurrently. To assist the supervisor in clearly distinguishing between methods belonging to different job-related areas, the processor 18 causes the method descriptions for different types of methods (e.g., safety, production, sales, etc.) to be displayed differently. For example, the Prepare screen shown by FIG. 4F includes a number of safety-related method descriptions 80, the lettering of which are italicized and displayed in a first color (e.g., blue), and further includes a number of production- or performance-related method descriptions 82, the lettering of which are presented in block type and displayed in a second color (e.g., black).

As with other aspects of the PDA 12, the method descriptions belonging to different job-related areas can not only be displayed in ways that help distinguish one type from the other, but they can also be displayed in ways that help a supervisor to rapidly prioritize the items on which the supervisor should more immediately focus his/her efforts. For example, suppose that at some point during a training and evaluation session an employee is having trouble with a plurality of issues, including one or more prescribed methods belonging to each of at least three different job-related areas, such as safety, sales and production. Practically speaking, this may be a typical scenario in the case of training a new employee, who has not yet become familiar with the multitude of employer-prescribed methods or practices to which he/she will eventually be expected to conform.

Therefore, because there may not always be enough time to address every issue during a given portion of a training session, and because it may be more important or even critical to address, for example, the safety issues first, before moving on to the next portion of the training session, the supervisor can rely on the visually distinct manner in which the safety and other such methods are displayed to instantly draw his/her attention to those items which need to be attended to first, second, etc. Having a device 12 that can be used in a high-paced, mobile training environment, and that is programmed to rapidly indicate and prioritize a plurality of evaluation and training issues by providing visual or other such cues to a supervisor (such as using color coded alert levels, as described above) is both highly novel and extremely advantageous to any organization that is faced with the task of having to conduct such evaluation and training sessions.

The PDA 12 is also configured to alert the supervisor of any prescribed work methods that the delivery driver is having particular trouble with. In other words, there may be some methods that the driver repeatedly fails to perform properly over the course of the OJS ride. To alert the supervisor to any such recurring problems, in one embodiment the PDA 12 is configured to generate an alert by changing the background color of a given method description in response to the frequency with which the driver requires corrective training on such method. As with the other such aspects described above, this same functionality is provided by each of the on-road evaluation and training screens described below, including "Travel," "Select," "Walk," "Contact," etc.

Analogous to the features associated with the timing elements described above, in one embodiment, the PDA 12 can be programmed so that if the box next to any particular method description is checked as many as five times during an OJS ride, indicating that the driver failed to adhere to that particular method on five separate occasions, the processor 18 would responsively cause the background color of such method description to turn from a first color (e.g., grey) to a second color (e.g., yellow). Similarly, if over the course of the OJS ride the same method is selected as many as ten times, the processor 18 can be programmed to change the background color from the second color (e.g., yellow) to a third color (e.g., orange). And, if selected as many as fifteen times, for example, the background can be changed yet again from the third color (e.g., orange) to a fourth color (e.g., red).

In other embodiments, this same functionality can just as easily be based on other statistical criteria related to the relative frequency with which a given method is selected. For example, rather than triggering each of the above-mentioned alert levels based on a fixed number of times that a given method has been selected, which fixed numbers are themselves likely to be based on pre-determined statistical data, such color changes can be triggered by other factors, such as a set of percentages that are calculated based on the number of times that a method is actually selected relative to the number of times that such method is expected to be performed by the employee over the course of the particular management session.

In yet another embodiment, as the number of items to be addressed at a given priority level (e.g., red, orange, yellow, etc.) exceeds a predetermined maximum, the PDA 12 can further be programmed to downgrade some of such items to a lower priority level (e.g., from red "down" to orange). The predetermined maximum could represent an upper bound on the number of items that a supervisor is likely to be able to handle in an effective manner, within a given time period. In yet another embodiment, the downgrading of such items could be subject to one or more additional criteria, such as a requirement that health and safety methods never be downgraded, regardless of the number of items currently displayed at a given priority level. In one embodiment, this can be done by providing the PDA 12 with a hierarchical list of all prescribed methods that are ordered according to their relative importance to one another. In other words, the PDA 12 can be programmed to further refine the process of helping supervisors prioritize their efforts by providing visual or other such cues that perpetually refocus a supervisor's attentions to those items which an organization deems to be most (or more) critical, such as addressing health and safety issues before production or sales items.

More generally, as with the features associated with the timing elements described above, the various types and levels of alerts that are provided by the PDA 12, visual or otherwise, are designed to help a supervisor rapidly recognize and prioritize the host of issues that can accumulate over the course of an often-times hectic management session. By providing such functionality, the PDA 12 helps to ensure that the maximum utility is derived from each and every management session. These benefits can be particularly advantageous for organizations faced with the considerable cost of having to perform such management sessions out in the field, with employees who are moving from place to place.

To better illustrate these points, consider the following basic example. Suppose that the on-road portion of an OJS ride comprises fifty delivery stops, and accordingly, the supervisor enters the Prepare element screen shown by FIG. 4F up to a corresponding fifty times to evaluate the driver's performance on "preparing" for each of the fifty stops. For the sake of this example, assume that the driver entered the Prepare element screen all fifty times, though this would not necessarily be required to perform an OJS ride. Now suppose that over the course of these fifty "prepare" elements, the delivery driver fails to properly perform, for example, the prescribed "Check Mirrors" method five out of the fifty times. As described above, on each of the five times that the driver fails to properly perform the "Check Mirrors" method, the supervisor checks the box next to the "Check Mirrors" method description, and the processor 18 records the check mark as input data in the memory 24 during the delivery stops where each of the infractions occurred.

As a way of alerting the supervisor to the fact that special attention may be required with regard to the prescribed "Check Mirrors" work method, the processor 18 can be programmed to alter the background color of the "Check Mirrors" method description based on the number of times it has been selected. Therefore, using the particular illustrative logic described above, in response to the "Check Mirrors" method being selected as many as five times, the processor 18 would cause the background color behind the "Check Mirrors" method description to turn from a first color (e.g., grey) to a second color (e.g., yellow). And, if at some point later in the OJS ride the delivery driver required training on the "Check Mirrors" method as many as ten times, for example, then the processor 18 would cause the background color of the "Check Mirrors" method description to change from the second color (e.g., yellow) to a third color (e.g., orange).

Those of ordinary skill in the art will understand that the PDA 12 can be programmed to respond to any number of such predetermined alert levels that are deemed appropriate for a given application of the PDA 12. In one embodiment, the PDA 12 is programmed to provide a supervisor with five distinct color-coded alert levels. This and other such visual alerts are extremely advantageous because they help a supervisor to maximize the effectiveness of the time he or she spends with a delivery driver, or other such subordinate, by prompting the supervisor to specifically target those work items that the employee is having the most trouble with. Thus, this and other aspects of the PDA 12 can help make an individual management session far more effective at eliminating a given employee's personalized work deficiencies than might otherwise have been possible using past evaluation and training techniques.

As the on-road portion of the OJS ride progresses through the component parts or elements of each delivery stop, the next on-road elements screen after Prepare that is typically selected by the supervisor is the Travel element screen. The Travel element screen is represented as state 52 in FIG. 3, and is best shown by the screen display of FIG. 4G.

As shown by FIG. 4G, the left-hand portion of the Travel screen comprises the elements menu described above, and the right-hand portion of the screen comprises a list of employer prescribed methods associated with the "travel" element of the delivery driver's workday. The travel element refers to the on-road portion of the driver's workday during which the driver is traveling to or from a delivery stop. The operation of, manner of display, and features associated with each of the method descriptions listed on the Travel screen operate in a manner as described above. In other words, if the driver commits a method infraction that is associated with the Travel element, the supervisor checks the box next to the corresponding method description, and the processor 18 records the check mark as input data in the memory 24. Methods categorized as belonging to different job-related areas are displayed in a visually distinct manner from each other. Furthermore, over the course of the on-road portion of the OJS ride, the processor 18 will alert the supervisor to any travel methods that the driver repeatedly fails to adhere to by, for example, changing the background color of such methods in a manner as described above.

During the travel time en route to a delivery stop, the supervisor typically accesses the Tools screen. The Tools screen is represented as state 54 in FIG. 3, and is best shown by the screen display of FIG. 4H. Among other things, the Tools screen comprises fields that allow the supervisor to enter the stop number and address of the next delivery stop. In one embodiment, the processor 18 causes the Tools screen to appear automatically in response to the user tapping on the Travel element. In another embodiment, the Tools screen does not appear automatically, but can still be accessed manually by using the stylus to tap on the Tools element that is located in the elements menu located on the left-hand side of the Travel screen, and other on-road screens.

The Tools screen further comprises fields for displaying and/or modifying the planned and actual SPORH (Stops Per On Road Hour) for the current OJS ride, and a number of function buttons such as "Change Color," "Element Methods," "Element Tally," "Notes," and "View Methods." The Change Color function allows the user to change the color of the screen. The Element Methods button allows the user the view the on-road methods associated with the element from which the user entered the Tools screen. The Element Tally button allows the user to view a running total of the number and type of method infractions that have been committed by the delivery driver during the OJS ride. The Notes button allows the user to record notes during the OJS ride. Any notes entered by the user will be "time-stamped" by the processor 18 so that the notes can be associated with the particular element and stop number during which they were entered. Finally, the View Methods button allows the user to access and read all method definitions.

To exit the Tools screen, and return to the elements screen from which the user initially accessed the Tools screen, the user clicks on the "Close" button. In other words, if the user entered the Tools screen from the Travel screen, then clicking on the Close button in the Tools screen will return the user to the Travel screen.

If the next stop along the delivery route involves delivering one or more packages to a customer, then after completing the travel element on route to the delivery stop, the supervisor typically selects the "Select" element screen from the elements menu located on the left-hand side of the Travel screen. The Select element screen is represented as state 56 in FIG. 3, and is best shown by the screen display of FIG. 4I.

As shown by FIG. 4I, the left-hand side of the Select screen comprises the elements menu of on-road elements screens that can be selected by the user during the on-road portion of the OJS ride. The right-hand portion of the Select screen comprises a number of stored data items relating to one or more management activities that are associated with the "select" element of a package delivery driver's workday. The "select" element refers to the period during which the driver selects one or more packages from the shelves or other space within the delivery vehicle for delivery to a customer. The items displayed on the right-hand portion of the Select screen include a set of timing-related features comprising an "Allow" field, an "Actual" field, and an "Allowances Off" button, each of which operate in a manner as described above.

Furthermore, as with other on-road-activities screens described above, the Select element screen also comprises a list of element-related methods describing practices to which the driver should adhere when performing the "select" element of his or her workday. As shown by FIG. 4I, the Select screen further comprises a field that allows the supervisor to input the number of packages selected from the delivery vehicle at a particular stop, and a corresponding field that is used to indicate whether the driver selected the package(s) from the Bulk Head (BH) or from the Rear Door (RD). Data fields such as the number of packages selected at each delivery stop may also be pre-filled automatically by the processor 18, based on data that was downloaded to the PDA 12 prior to each OJS ride. As mentioned above, the data downloaded to the PDA 12 can include a list of all planned stops along the driver's delivery route, the address of each stop, a list of known packages to be delivered and/or picked up at each stop, and other data relevant to the plan for that day.

After arriving at a delivery stop location, and after performing evaluation and training associated with selecting any packages for delivery, the supervisor typically selects the "Walk" screen by tapping on the "To Walk" button found in the elements menu located on the left-hand side of the current on-road-activities screen. The Walk element screen is represented as state 58 in FIG. 3, and is best shown by the screen display of FIG. 4J.

As shown by FIG. 4J, the left-hand side of the Walk screen comprises the elements menu of on-road elements screens that can be selected by the user during the on-road portion of the OJS ride. The right-hand portion of the Walk screen comprises a number of stored data items relating to one or more management activities associated with the "walk" element of a package delivery driver's workday. The "walk" element refers to any period during which the delivery driver is walking to or from a customer location. As with other on-road-activities screens described above, the Walk element screen comprises a list of element-related methods describing practices to which the driver should adhere when performing the walk element of his or her workday. By tapping on the "From Walk" button found in the elements menu, the Walk screen shown in FIG. 4J is used in a similar manner during the corresponding return walk from the customer location to the delivery vehicle. In one embodiment, the "To Walk" screen and the "From Walk" screen both appear as shown in FIG. 4J.

In another embodiment, the "To Walk" screen and the "From Walk" screen can contain one or more elements that are particular to each of those "walk" segments.

After completing the walk from the package delivery vehicle to the customer location associated with the current stop, the supervisor typically selects the "Contact" element screen from the elements menu located on the left-hand side of the current on-road-activities screen. The "contact" element refers to the point at which the delivery driver delivers and/or picks up a package from a customer. To assist the supervisor in performing evaluation and training during the contact element of driver's day, the PDA 12 provides two separate screens. As noted above, during the setup phase of the OJS ride the supervisor can set the default contact mode to manual, delivery or pickup. If the contact mode is set to manual, then the user will need to manually select which contact screen should be displayed upon entering the contact mode. This can be done by selecting between the "Del" (Delivery) and "PU" (Pickup) buttons that are displayed at the top of both contact screens.

If the driver is in the process of delivering a package, the "Delivery Contact" screen should be displayed on the PDA 12. The Delivery Contact screen is represented as state 60 in FIG. 3, and is best shown by the screen display of FIG. 4K.

As shown by FIG. 4K, the left-hand side of the Delivery Contact screen comprises the elements menu of on-road elements screens that can be selected by the user during the on-road portion of the OJS ride. The right-hand portion of the Delivery Contact screen comprises a number of stored data items relating to one or more management activities that are associated with the "delivery contact" element of a package delivery driver's workday.

The items displayed on the right-hand portion of the Delivery Contact screen include a set of timing-related features comprising an "Allow" field, an "Actual" field, and an "Allowances Off" button, each of which operate in a manner as described above. Similarly, as with other on-road-activities screens described above, the Delivery Contact element screen comprises a list of element-related methods describing practices to which the driver should adhere when performing the "delivery contact" element of his or her workday. As shown by FIG. 4K, the Delivery Contact screen further comprises a field that allows the supervisor to input the number of packages delivered at a particular stop, and a corresponding field that is used to indicate whether the package(s) require a Signature (Sig) or can be Driver Released (DR).

If the driver is in the process of receiving or Picking Up a package, the "PU Contact" screen should be displayed on the PDA 12. The PU Contact screen is represented as state 62 in FIG. 3, and is best shown by the screen display of FIG. 4L.

Figure 4L:

As shown by FIG. 4L, the left-hand side of the PU Contact screen comprises the elements menu of on-road elements screens that can be selected by the user during the on-road portion of the OJS ride. The right-hand portion of the PU Contact screen comprises a number of stored data items relating to one or more management activities that are associated with the "pick-up contact" element of a package delivery driver's workday.

The items displayed on the right-hand portion of the PU Contact screen include a set of timing-related features comprising an "Allow" field, an "Actual" field, and an "Allowances Off" button, each of which operate in a manner as described above. Similarly, as with other on-road-activities screens described above, the PU Contact element screen comprises a list of element-specific methods describing practices to which the driver should adhere when performing the pick-up contact element of his or her workday. As shown by FIG.

4L, the PU Contact screen further comprises a field that allows the supervisor to input the number of packages received at a particular stop. The screen also comprises a "Drop Box Audit" button that, when selected, will bring up other screen(s) that allow a supervisor to perform an audit of a package drop box that is positioned for customer use at the current stop location.

If the driver has picked up one or more packages at the current stop, then upon returning to the delivery vehicle the supervisor typically selects the "Load" element screen from the elements menu located on the left-hand side of the current on-road-activities screen. The Load element screen is represented as state 64 in FIG. 3, and is best shown by the screen display of FIG. 4M.

As shown by FIG. 4M, the left-hand side of the Load screen comprises the elements menu of on-road elements screens that can be selected by the user during the on-road portion of the OJS ride. The right-hand portion of the Load screen comprises a number of stored data items relating to one or more management activities that are associated with the "load" element of a package delivery driver's workday. The "load" element refers to the point at which the delivery driver loads any packages received at the current stop location on to an appropriate shelf or other space within the delivery vehicle.

The items displayed on the right-hand portion of the Load screen include a set of timing-related features comprising an "Allow" field, an "Actual" field, and an "Allowances Off" button, each of which operate in a manner as described above. Similarly, as with other on-road-activities screens described above, the Load element screen also comprises a list of element-related methods describing practices to which the driver should adhere when performing the "load" element of his or her workday. As shown by FIG. 4M, the Load screen further comprises a field that allows the supervisor to input the number of packages that are loaded on to the delivery vehicle by the driver at a particular stop.

To accommodate time periods such as lunch and other such breaks that can occur during the on-road portion of an OJS ride, the PDA 12 is configured to allow the supervisor to take a break without affecting any ongoing time-study data. In other words, taking a break stops all clocks and does not impact any of the delivery driver's timing allowances. To take a break during the on-road portion of the OJS ride, the supervisor selects the "Time Out" element screen from the elements menu located on the left-hand side of the current on-road-activities screen. The Time Out element screen is represented as state 66 in FIG. 3, and is best shown by the screen display of FIG. 4N.

Figure 4P:
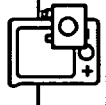
Figure 4O:
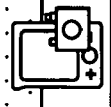
Figure 4N:

As shown by FIG. 4N, the Time Out screen comprises a field for the user to enter or select a type of time out. This is typically done by clicking on the scroll-down key and selecting the appropriate item from the drop down list. The Time Out screen also comprises a "Started Break" time field, which the processor 18 pre-fills with the time that the user selected the Time Out screen from the elements menu in the previous window. During a time out, the supervisor can choose to "Review the published Methods" associated with a given element, or check the latest "Element Tally" by clicking on the appropriate button as shown in FIG. 4N. To resume all timing operations and return to the previous on-road-activities screen, the supervisor taps in the "Finish at form exit" field and clicks OK. The "Finish at form exit" field pre-fills with the current time, and the user is returned to the window that they were at prior to initiating the time out.

At the conclusion of the on-road portion of the OJS ride, the supervisor can return to the OJS Ride Menu at state 46 by clicking the "ok" button found in the upper right-hand corner of each of the on-road-activities screens. The OJS Ride Menu is best shown by the screen display of FIG. 4D.

If the "Record Inside PM Activities" function is selected from the OJS Ride Menu, the inside PM branch leads to state 68 wherein the Inside PM Activities screen is displayed. The phrase "Inside PM" refers to the portion of a package delivery driver's workday that occurs after the driver completes his or her delivery route and returns to the package center. The Inside PM screen is best shown by the screen display of FIG. 4O.

As shown by FIG. 4O, the Inside PM screen includes fields for displaying the starting mileage, the ending mileage, and the total mileage for the OJS ride. While the starting mileage is automatically transferred from the Inside AM screen, the ending mileage must be entered manually. To enter the ending mileage of the package delivery vehicle, the supervisor taps in the "Mileage" field, which causes a keyboard to appear in the bottom portion of the display screen 20. After entering the mileage, the user causes the keyboard to disappear by tapping on the small keyboard icon located in the lower right-hand corner of the window. To see the total miles traveled, the user taps in the "Total Miles" field, which causes the processor 18 to calculate and display the difference between the ending and starting mileage for the current OJS ride. The supervisor can also select any method that the delivery driver fails to adhere to during the Inside PM portion of the OJS ride. To select an Inside PM method that the delivery driver has failed to adhere to, the supervisor clicks in the box to the left of the corresponding method description. To review what the correct Inside PM methods are, the supervisor can click on the "Inside PM Methods" button.

At the conclusion of the Inside PM portion of the OJS ride, the supervisor can return to the OJS Ride Menu at state 46 by clicking the "ok" button found in the upper right-hand corner of the Inside PM screen. The OJS Ride Menu is best shown by the screen display of FIG. 4D.

At this point in the process, the supervisor has finished performing the three major portions of a typical OJS ride. As a result, the OJS Ride Menu screen of FIG. 4D will now include a "Get Driver Signature" button (not shown). Tapping on the "Get Driver Signature" button will cause the processor 18 to display the "Get Driver Signature" screen. The Get Driver Signature screen is represented as state 70 in FIG. 3, and is best shown by the screen display of FIG. 4P. Using the stylus, the driver should sign his or her name in the middle of the screen as shown in FIG. 4P. After the driver's signature has been entered, the supervisor can tap the "ok" button in the upper right-hand corner of the Get Driver Signature screen. This causes the processor 18 to again display the OJS Ride Menu screen, best shown by FIG. 4D. To continue exiting the current OJS ride, the supervisor taps the "ok" button in the upper right-hand corner of the OJS Ride Menu screen. In response to this action, a pop-up message will appear asking the supervisor to confirm that he or she would like to end the current OJS ride. When the supervisor taps "yes," the OJS ride is complete.

With the OJS ride complete, the record of activity from the PDA 12 is ready for uploading to the remote personal computer 14. Additionally, as described above, some or all of the OJS ride information contained in the record of activity can be communicated from the remote personal computer 14 and/or the PDA 12 to the central computer system 16, for storage in the OJS database 32. In one embodiment, the OJS ride information can be uploaded automatically to the remote personal computer 14 by placing the PDA 12 in a cradle that is connected to communicate with the remote personal computer via a cable. Application software contained on the PDA 12 and the remote personal computer 14 handle the synchronization and transfer of all data.

The application software contained on the remote personal computer 14 can be used to generate various reports that illustrate one or more aspects of the driver's and/or the supervisor's performance during the OJS ride. For example, one such report is the "Service Provider Methods Evaluation" report, which summarizes by element the observations and method infractions that were recorded by the supervisor during the OJS ride using the PDA 12. In other words, this report is a summary of all events that occurred during the various parts of the OJS ride, including "Inside AM," "Prepare," "Travel," "Select," "Walk," "Delivery," "Pickup,""Load," and "Inside PM." More generally, information obtained out in the field using the PDA 12 can be processed by the remote personal computer 14 to generate a number reports that are designed to help an organization analyze and identify one or more areas of interest. In one embodiment, such areas of interest may include, for example, identifying recurring problems with delivery drivers; efficiently planning the delivery of off-road training programs; analyzing the efficiency and effectiveness of supervisors performing evaluation and training sessions; exposing faulty practices that may be hindering the efficiency and effectiveness of the organization as a whole; and other such issues that are of interest to the organization.

Many modifications and other embodiments of the invention set forth herein will come to mind to one skilled in the art to which this invention pertains having the benefit of the teachings presented in the foregoing descriptions and the associated drawings. For example, while the preferred embodiment described in detail above focuses on evaluation and training of package delivery drivers, it will be readily understood by those skilled in the art that the systems and methods described herein can be used to coordinate management activities associated with a wide variety of different types of organizations. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A portable device for recording and evaluating a subordinate's work, comprising:
   a user interface for receiving information;
   an information storage device;
   a screen device for displaying information; and
   a processor coupled to said user interface, said information storage device, and said screen device, said processor configured for:
   storing, on said portable device, data associated with a plurality of job elements, wherein each of said plurality of job elements corresponds to a work activity of said subordinate's work session and comprises a set of job methods to be performed by a subordinate over the course of said work session;
   displaying, on said portable device, a first screen window comprising a listing of said job elements;
   receiving a first input comprising a selection of a first of said job elements, said first of said job elements relating to a first work activity of said subordinate's work;
   responsive to said first input, displaying, on said portable device, a second screen window associated with said first of said job elements relating to said subordinate's first work activity, said second screen window displaying a first particular set of job methods to be performed by said subordinate, said first particular set of job methods corresponding to said first job element;
   receiving a second input comprising a measurement indicating that said subordinate has failed to comply with at least one job method of said first particular set of job methods;
   responsive to said second input indicating that said measurement exceeds a predetermined threshold for said at least one job method, altering a display of said at least one job method on said second screen window;
   receiving a third input comprising a selection of a second of said job elements, said second of said job elements relating to a second work activity of said subordinate's work;
   responsive to said third input, displaying, on said portable device, a third screen window associated with said second of said job elements relating to said subordinate's second work activity, said third screen window displaying a second particular set of job methods to be performed by said subordinate, said second particular set of job methods corresponding to said second job element;
   receiving a fourth input comprising a measurement indicating that said subordinate has failed to comply with at least one job method of said second particular set of job methods; and
   responsive to said fourth input indicating that said measurement exceeds a predetermined threshold for said at least one job method, altering a display of said at least one job method on said third screen window, wherein:
   said second screen window comprises a concurrent display of said first particular set of job methods, and
   said third screen window comprises a concurrent display of said second particular set of job methods.

2. The portable device of claim 1, wherein said data stored on said portable device further comprises written descriptions of said first and second particular sets of job methods.

3. The portable device of claim 1, wherein said second input is received from a sensor positioned on a vehicle used by said subordinate during said first work activity.

4. A method of recording and evaluating a subordinate's work, comprising:
   storing, on a portable computer, data associated with a plurality of job elements, wherein each of said plurality of job elements corresponds to a work activity of said subordinate's work session and comprises a set of job methods to be performed by a subordinate over the course of said work session;
   displaying, on said portable computer, a first screen window comprising a listing of said job elements;
   receiving a first input comprising a selection of a first of said job elements, said first of said job elements relating to a first work activity of said subordinate's work;
   responsive to said first input, displaying, on said portable computer, a second screen window associated with said first of said job elements relating to said subordinate's first work activity, said second screen window displaying a first particular set of job methods to be performed by said subordinate, said first particular set of job methods corresponding to said first job element;
   receiving a second input comprising a first measurement indicating that said subordinate has failed to comply with at least one job method of said first particular set of job methods;

responsive to said second input indicating that said first measurement exceeds an associated predetermined threshold, altering a display of said at least one job method on said second screen window, wherein said second screen window comprises a concurrent display of said first particular set of job methods;

receiving a third input comprising a selection of a second of said job elements, said second of said job elements relating to a second work activity of said subordinate's work;

responsive to said third input, displaying, on said portable computer, a third screen window associated with said second of said job elements relating to said subordinate's second work activity, said third screen window displaying a second particular set of job methods to be performed by said subordinate, said second particular set of job methods corresponding to said second job element;

receiving a fourth input comprising a second measurement indicating that said subordinate has failed to comply with at least one job method of said second particular set of job methods; and responsive to said fourth input indicating that said second measurement exceeds a predetermined threshold, altering a display of said at least one job method of said second particular set of job methods on said third screen window, wherein said third screen window comprises a concurrent display of said second particular set of job methods.

5. The method of claim 4, wherein a selection area is displayed in association with said first particular set of job methods, and the method further comprises:

selecting job method on said second screen window; and responsive to selection of the selected job method, storing an indication that said subordinate failed to comply with said selected job method.

6. The method of claim 4, wherein the step of storing data includes storing written descriptions of each job method of the first and second sets of job methods.

7. The portable device of claim 1, wherein said second input is received wirelessly from a sensor positioned on a vehicle used by said subordinate during said first work activity.

8. The portable device of claim 3, wherein said sensor positioned on said vehicle is adapted to sense one or more types of data selected from a group consisting of: door data, global positioning data, engine data, weather data, ignition data, and mileage data.

9. The portable device of claim 1, wherein said processor is configured for displaying said second screen window concurrently with said first screen window on said portable computer in response to receiving said first input comprising said selection of said first of said job elements, and said processor is configured for displaying said third screen window concurrently with said first screen window on said portable computer in response to receiving said third input comprising said selection of said second of said job elements.

10. The method of claim 4, wherein the step of displaying said second screen window is performed by displaying said second screen window concurrently with said first screen window on said portable computer in response to receiving said first input comprising said selection of said first of said job elements, and the step of displaying said screen third window is performed by displaying said third screen window concurrently with said first screen window on said portable computer in response to receiving said third input comprising said selection of said second of said job elements.

* * * * *

UNITED STATES PATENT AND TRADEMARK OFFICE
CERTIFICATE OF CORRECTION

PATENT NO. : 7,571,111 B2  Page 1 of 1
APPLICATION NO. : 10/812484
DATED : August 4, 2009
INVENTOR(S) : Ahrens et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 924 days.

Signed and Sealed this

Seventh Day of September, 2010

David J. Kappos
*Director of the United States Patent and Trademark Office*